(12) United States Patent
Bruton et al.

(10) Patent No.: US 8,339,040 B2
(45) Date of Patent: Dec. 25, 2012

(54) FLEXIBLE ELECTROLUMINESCENT DEVICES AND SYSTEMS

(75) Inventors: Eric A. Bruton, St. Louis, MO (US); Mauricio Pinto, Hilliard, OH (US); Shane Haley, Florissant, MO (US)

(73) Assignee: Lumimove, Inc., St. Louis, MO (US)

( * ) Notice: Subject to any disclaimer, the term of this patent is extended or adjusted under 35 U.S.C. 154(b) by 683 days.

(21) Appl. No.: 12/316,969

(22) Filed: Dec. 18, 2008

(65) Prior Publication Data
US 2009/0212690 A1   Aug. 27, 2009

Related U.S. Application Data

(60) Provisional application No. 61/008,115, filed on Dec. 18, 2007.

(51) Int. Cl.
*H05B 33/00* (2006.01)
(52) U.S. Cl. .................. 313/511; 313/506; 313/509
(58) Field of Classification Search .................. None
See application file for complete search history.

(56) References Cited

U.S. PATENT DOCUMENTS

| | | | |
|---|---|---|---|
| 4,035,686 A | 7/1977 | Fleming |
| 4,138,620 A | 2/1979 | Dickson |
| 4,143,297 A | 3/1979 | Fischer |
| 4,458,177 A | 7/1984 | Hunter et al. |
| 4,534,743 A | 8/1985 | D'Onofrio et al. |
| 4,608,308 A | 8/1986 | Igarashi et al. |
| 4,617,195 A | 10/1986 | Mental |
| 4,645,970 A | 2/1987 | Murphy |
| 4,661,373 A | 4/1987 | Kato et al. |
| 4,684,353 A | 8/1987 | deSouza |
| 4,687,968 A | 8/1987 | Frayer |
| 4,767,679 A | 8/1988 | Kawachi |
| 4,775,964 A | 10/1988 | Alessio et al. |
| 4,816,717 A | 3/1989 | Harper et al. |
| 4,832,459 A | 5/1989 | Harper et al. |
| 4,853,594 A | 8/1989 | Thomas |
| 4,902,567 A | 2/1990 | Eilertsen et al. |
| 4,904,901 A | 2/1990 | Simopoulos et al. |

(Continued)

FOREIGN PATENT DOCUMENTS

EP   0 286 748 A1   10/1988

(Continued)

OTHER PUBLICATIONS

The International Bureau of WIPO, Geneva, Switzerland, PCT International Preliminary Report on Patent Ability, issued Jun. 22, 2010, mailed Jul. 1, 2010, International Application No. PCT/US2008/013836, filed Dec. 18, 2008, Lumimove, Inc., DBA Crosslink et al.

(Continued)

*Primary Examiner* — Ashok Patel
(74) *Attorney, Agent, or Firm* — Nelson Mullins Riley & Scarborough, LLP (57) ABSTRACT

An electroluminescent device is provided. The electroluminescent device includes an intrinsically conductive polymer layer having a thickness of from about 0.1 to about 3 microns and an elongation less than about 100%; and a phosphor layer having a thickness from about 20 microns to about 70 microns. The electroluminescent device demonstrates a loss of brightness of less than about 10% after undergoing repeated creasing, crushing, flexing, twisting, abrading, and/or stretching.

12 Claims, 3 Drawing Sheets

U.S. PATENT DOCUMENTS

| | | |
|---|---|---|
| 5,003,222 A | 3/1991 | Washo |
| 5,036,249 A | 7/1991 | Pike-Biegunski et al. |
| 5,051,654 A | 9/1991 | Nativi et al. |
| 5,184,969 A | 2/1993 | Sharpless et al. |
| 5,220,243 A | 6/1993 | Klinedinst et al. |
| 5,245,517 A | 9/1993 | Fenton |
| 5,300,858 A | 4/1994 | Nikaido |
| 5,309,060 A | 5/1994 | Sharpless et al. |
| 5,317,169 A | 5/1994 | Nakano et al. |
| 5,352,951 A | 10/1994 | Kardon et al. |
| 5,442,021 A | 8/1995 | Heiliger |
| 5,454,892 A | 10/1995 | Kardon et al. |
| 5,466,541 A | 11/1995 | Van Havenbergh et al. |
| 5,488,266 A | 1/1996 | Aoki et al. |
| 5,493,183 A | 2/1996 | Kimball |
| 5,508,585 A | 4/1996 | Butt |
| 5,530,318 A | 6/1996 | Ensign, Jr. et al. |
| 5,552,679 A | 9/1996 | Murasko |
| 5,569,530 A | 10/1996 | Dooms et al. |
| 5,570,114 A | 10/1996 | Fowler |
| 5,621,274 A | 4/1997 | McGuigan |
| 5,663,005 A | 9/1997 | Dooms et al. |
| 5,676,451 A | 10/1997 | Tabanera |
| 5,703,436 A | 12/1997 | Forrest et al. |
| 5,719,467 A | 2/1998 | Antoniadis et al. |
| 5,726,531 A | 3/1998 | Hirose et al. |
| 5,757,125 A | 5/1998 | Furlong et al. |
| 5,757,139 A | 5/1998 | Forrest et al. |
| 5,766,515 A | 6/1998 | Jonas et al. |
| 5,770,920 A | 6/1998 | Eckersley et al. |
| 5,779,346 A | 7/1998 | Burke |
| 5,783,292 A | 7/1998 | Tokito et al. |
| 5,786,664 A | 7/1998 | Liu |
| 5,789,021 A | 8/1998 | Dooms et al. |
| 5,806,389 A | 9/1998 | McGuigan |
| 5,807,945 A | 9/1998 | Chen et al. |
| 5,808,412 A | 9/1998 | Zovko et al. |
| 5,811,930 A | 9/1998 | Krafcik et al. |
| 5,821,691 A | 10/1998 | Richie et al. |
| 5,830,028 A | 11/1998 | Zovko et al. |
| 5,834,893 A | 11/1998 | Bulovic et al. |
| 5,856,029 A | 1/1999 | Burrows |
| 5,856,030 A | 1/1999 | Burrows |
| 5,856,031 A | 1/1999 | Burrows |
| 5,866,039 A | 2/1999 | Morton |
| 5,876,863 A | 3/1999 | Feldman et al. |
| 5,882,806 A | 3/1999 | Mori |
| 5,891,975 A | 4/1999 | Chen et al. |
| 5,902,689 A | 5/1999 | Vleggaar et al. |
| 5,905,128 A | 5/1999 | Chen et al. |
| 5,910,385 A | 6/1999 | Gardner et al. |
| 5,912,533 A | 6/1999 | Lee et al. |
| 5,917,280 A | 6/1999 | Burrows et al. |
| 5,928,801 A | 7/1999 | Broer et al. |
| 5,959,402 A | 9/1999 | Polyan |
| 5,986,400 A | 11/1999 | Staring et al. |
| 5,994,496 A | 11/1999 | Van Haare et al. |
| 6,004,686 A | 12/1999 | Rasmussen et al. |
| 6,014,116 A | 1/2000 | Haynes et al. |
| 6,014,119 A | 1/2000 | Staring et al. |
| 6,034,481 A | 3/2000 | Haynes |
| 6,046,543 A | 4/2000 | Bulovic et al. |
| 6,054,809 A | 4/2000 | Haynes et al. |
| 6,066,830 A | 5/2000 | Cline et al. |
| 6,083,635 A | 7/2000 | Jonas et al. |
| 6,090,309 A | 7/2000 | Chadha et al. |
| 6,090,434 A | 7/2000 | Sugiura et al. |
| 6,111,362 A | 8/2000 | Coghlan et al. |
| 6,114,463 A | 9/2000 | Chen et al. |
| 6,144,156 A | 11/2000 | Lutschounig et al. |
| 6,153,254 A | 11/2000 | Young et al. |
| 6,160,828 A | 12/2000 | Kozlov et al. |
| 6,162,490 A | 12/2000 | Graves et al. |
| 6,248,457 B1 | 6/2001 | Chen et al. |
| 6,270,834 B1 | 8/2001 | Burrows |
| 6,274,985 B1 | 8/2001 | Haynes |
| 6,277,504 B1 | 8/2001 | Koch et al. |
| 6,280,909 B1 | 8/2001 | Gill et al. |
| 6,303,238 B1 | 10/2001 | Thompson et al. |
| 6,309,764 B1 | 10/2001 | Burrows |
| 6,315,923 B1 | 11/2001 | Devenney et al. |
| 6,320,633 B1 | 11/2001 | Broer et al. |
| 6,356,029 B1 | 3/2002 | Hunter |
| 6,359,605 B1 | 3/2002 | Knapp et al. |
| 6,372,366 B1 | 4/2002 | Yoneda |
| 6,373,454 B1 | 4/2002 | Knapp et al. |
| 6,376,107 B1 | 4/2002 | Heuer et al. |
| 6,391,481 B1 | 5/2002 | Jonas et al. |
| 6,400,093 B1 | 6/2002 | Baumberg et al. |
| 6,400,348 B1 | 6/2002 | Young |
| 6,403,239 B2 | 6/2002 | Chen et al. |
| 6,421,507 B1 | 7/2002 | Heemstra |
| 6,432,560 B1 | 8/2002 | Verhoeven et al. |
| 6,441,560 B1 | 8/2002 | Hunter |
| 6,444,400 B1 | 9/2002 | Cloots et al. |
| 6,445,128 B1 | 9/2002 | Bush et al. |
| 6,448,718 B1 | 9/2002 | Battersby |
| 6,451,460 B1 | 9/2002 | Sun et al. |
| 6,459,208 B2 | 10/2002 | Battersby |
| 6,465,951 B1 | 10/2002 | Krafcik et al. |
| 6,479,930 B1 | 11/2002 | Tanabe et al. |
| 6,479,941 B1 | 11/2002 | Abe et al. |
| 6,498,438 B1 | 12/2002 | Edwards |
| 6,503,643 B1 | 1/2003 | Heuer et al. |
| 6,528,943 B2 | 3/2003 | Coghlan et al. |
| 6,534,200 B1 | 3/2003 | Heuer et al. |
| 6,541,128 B2 | 4/2003 | Wehrmann et al. |
| 6,542,138 B1 | 4/2003 | Shannon et al. |
| 6,579,631 B2 | 6/2003 | Lee |
| 6,583,584 B2 | 6/2003 | Duineveld et al. |
| 6,611,245 B1 | 8/2003 | Edwards |
| 6,613,455 B1 | 9/2003 | Matsumoto et al. |
| 6,621,212 B1 | 9/2003 | Pennaz et al. |
| 6,621,766 B2 | 9/2003 | Brewer et al. |
| 6,624,569 B1 | 9/2003 | Pennaz et al. |
| 6,637,906 B2 | 10/2003 | Knoerzer et al. |
| 6,650,047 B2 | 11/2003 | Aoki et al. |
| 6,655,788 B1 | 12/2003 | Freeman |
| 6,693,610 B2 | 2/2004 | Shannon et al. |
| 6,696,786 B2 | 2/2004 | Burrows |
| 6,703,781 B2 | 3/2004 | Zovko |
| 6,717,360 B2 | 4/2004 | Chu |
| 6,717,361 B2 | 4/2004 | Burrows |
| 6,720,203 B2 | 4/2004 | Carcia et al. |
| 6,723,454 B2 | 4/2004 | Verhoeven et al. |
| 6,727,647 B2 | 4/2004 | Fukuda et al. |
| 6,737,228 B2 | 5/2004 | Elst et al. |
| 6,738,031 B2 | 5/2004 | Young et al. |
| 6,743,525 B2 | 6/2004 | Berntsen et al. |
| 6,759,147 B2 | 7/2004 | Verhoeven et al. |
| 6,777,884 B1 | 8/2004 | Barnardo et al. |
| 6,781,307 B2 | 8/2004 | Lee |
| 6,787,987 B2 | 9/2004 | Duineveld et al. |
| 6,798,140 B2 | 9/2004 | Reim et al. |
| 6,806,642 B2 | 10/2004 | Pires et al. |
| 6,818,325 B2 | 11/2004 | Mishima et al. |
| 6,818,326 B2 | 11/2004 | Zovko |
| 6,831,411 B2 | 12/2004 | Tanabe et al. |
| 6,833,283 B2 | 12/2004 | Epstein et al. |
| 6,833,669 B2 | 12/2004 | George et al. |
| 6,835,112 B2 | 12/2004 | Tanabe et al. |
| 6,838,820 B2 | 1/2005 | Van Der Schaft et al. |
| 6,853,013 B2 | 2/2005 | Hirari et al. |
| 6,866,901 B2 | 3/2005 | Burrows et al. |
| 6,882,104 B2 | 4/2005 | Miwa et al. |
| 6,887,556 B2 | 5/2005 | Lamotte et al. |
| 6,888,318 B2 | 5/2005 | Childs |
| 6,908,695 B2 | 6/2005 | Seo et al. |
| 6,916,553 B2 | 7/2005 | Willaert et al. |
| 6,919,158 B2 | 7/2005 | Kawamura et al. |
| 6,922,020 B2 | 7/2005 | Pennaz et al. |
| 6,955,772 B2 | 10/2005 | Van den Bogaert |
| 6,956,561 B2 | 10/2005 | Han |
| 6,962,757 B2 | 11/2005 | Epstein et al. |
| 7,005,798 B2 | 2/2006 | Carcia et al. |
| 7,009,337 B2 | 3/2006 | Urabe |
| 7,011,561 B2 | 3/2006 | Duineveld et al. |

| | | |
|---|---|---|
| 7,026,027 B2 | 4/2006 | Turner et al. |
| 7,037,640 B2 | 5/2006 | Koninckx et al. |
| 7,038,376 B2 | 5/2006 | Liedenbaum |
| 7,049,536 B1 | 5/2006 | Marcus et al. |
| 7,067,976 B2 | 6/2006 | Yamazaki |
| 7,083,861 B2 | 8/2006 | Tanabe et al. |
| 7,084,236 B2 | 8/2006 | Duineveld et al. |
| 7,088,039 B2 | 8/2006 | Barnardo et al. |
| 7,098,525 B2 | 8/2006 | Bai et al. |
| 7,105,998 B2 | 9/2006 | Fukuda |
| 7,109,522 B2 | 9/2006 | Young |
| 7,115,216 B2 | 10/2006 | Carter et al. |
| 7,118,836 B2 | 10/2006 | Andriessen |
| 7,129,914 B2 | 10/2006 | Knapp et al. |
| 7,135,712 B2 | 11/2006 | Broer et al. |
| 7,145,529 B2 | 12/2006 | Vulto et al. |
| 7,148,076 B2 | 12/2006 | Seo et al. |
| 7,148,623 B2 | 12/2006 | Vlaskin et al. |
| 7,157,745 B2 | 1/2007 | Blonder et al. |
| 7,163,739 B2 | 1/2007 | Koike et al. |
| 7,164,140 B2 | 1/2007 | Tazaki et al. |
| 7,176,616 B2 | 2/2007 | Yamashita |
| 7,186,936 B2 | 3/2007 | Marcus et al. |
| 7,202,600 B2 | 4/2007 | Zovko et al. |
| 7,208,760 B2 | 4/2007 | Hector et al. |
| 7,221,342 B2 | 5/2007 | Fish |
| 7,242,145 B2 | 7/2007 | Young |
| 7,247,342 B2 | 7/2007 | Willaert et al. |
| 7,262,551 B2 | 8/2007 | Bechtel et al. |
| 7,271,409 B2 | 9/2007 | Young et al. |
| 7,271,534 B2 | 9/2007 | Padiyath et al. |
| 7,279,777 B2 | 10/2007 | Bai et al. |
| 7,285,909 B2 | 10/2007 | Bertram et al. |
| 7,291,968 B2 | 11/2007 | Fish et al. |
| 7,304,317 B2 | 12/2007 | Bermel et al. |
| 7,306,346 B2 | 12/2007 | Fukuoka et al. |
| 7,324,074 B2 | 1/2008 | Lee et al. |
| 7,345,421 B2 | 3/2008 | Harada et al. |
| 7,354,785 B2 | 4/2008 | Kabay et al. |
| 7,358,529 B2 | 4/2008 | Childs et al. |
| 7,390,578 B2 | 6/2008 | Berntsen et al. |
| 7,393,554 B2 | 7/2008 | Hayashi et al. |
| 7,407,716 B2 | 8/2008 | Patwardhan et al. |
| 7,411,143 B2 | 8/2008 | Shin et al. |
| 7,413,916 B2 | 8/2008 | Seo et al. |
| 7,453,204 B2 | 11/2008 | Kitamura |
| 2003/0022020 A1 | 1/2003 | Epstein et al. |
| 2003/0030383 A1 | 2/2003 | Revivo |
| 2003/0151118 A1 | 8/2003 | Baude et al. |
| 2003/0207488 A1 | 11/2003 | Carcia et al. |
| 2003/0215669 A1 | 11/2003 | Kathirgamanathan et al. |
| 2004/0018382 A1* | 1/2004 | Kinlen .................. 428/690 |
| 2004/0032208 A1 | 2/2004 | Wu et al. |
| 2004/0046496 A1 | 3/2004 | Mishima |
| 2004/0183434 A1 | 9/2004 | Yeh et al. |
| 2005/0023960 A1 | 2/2005 | Harada et al. |
| 2005/0067952 A1 | 3/2005 | Fechter et al. |
| 2005/0158523 A1 | 7/2005 | Gupta et al. |
| 2005/0168140 A1 | 8/2005 | Nakamura et al. |
| 2005/0253511 A1 | 11/2005 | Zovko et al. |
| 2005/0264179 A1 | 12/2005 | Mikhael et al. |
| 2005/0275347 A1 | 12/2005 | Liang et al. |
| 2005/0285515 A1 | 12/2005 | Vlaskin et al. |
| 2006/0035079 A1 | 2/2006 | Xu et al. |
| 2006/0103300 A1 | 5/2006 | Powell |
| 2006/0132025 A1 | 6/2006 | Gao et al. |
| 2006/0132027 A1 | 6/2006 | Gao |
| 2006/0132030 A1 | 6/2006 | Gao et al. |
| 2006/0170332 A1 | 8/2006 | Tamaki et al. |
| 2006/0180810 A1 | 8/2006 | Lee et al. |
| 2006/0235133 A1 | 10/2006 | Suzuki et al. |
| 2006/0268537 A1 | 11/2006 | Kurihara et al. |
| 2006/0278509 A1 | 12/2006 | Marcus et al. |
| 2006/0291186 A1 | 12/2006 | Marcus et al. |
| 2007/0080623 A1 | 4/2007 | Iimura |
| 2007/0082578 A1 | 4/2007 | Haynes |
| 2007/0129613 A1 | 6/2007 | Rochester et al. |
| 2007/0278943 A1 | 12/2007 | Hartmann et al. |
| 2008/0030126 A1 | 2/2008 | Scholz et al. |
| 2008/0054786 A1 | 3/2008 | Date et al. |
| 2008/0093978 A1 | 4/2008 | Mori |
| 2008/0136314 A1 | 6/2008 | Brown et al. |
| 2009/0109435 A1* | 4/2009 | Kahen et al. .................. 356/317 |
| 2009/0212690 A1* | 8/2009 | Bruton et al. ................. 313/504 |

FOREIGN PATENT DOCUMENTS

| | | |
|---|---|---|
| EP | 0443 861 A2 | 2/1991 |
| WO | WO 2005/122643 A1 | 12/2005 |

OTHER PUBLICATIONS

PCT International Search Report, completed and mailed Apr. 3, 2009, for International Patent Application No. PCT/US2008/013836, International filed Dec. 18, 2008, Lumimove Inc., DBA CROSSLINK.

International Search Report, completed Jul. 7, 2004, mailed Jul. 16, 2004, PCT/IB2004/050290, PCT WO 2004/086530 A1, published with international search report Oct. 7, 2004.

International Search Report, completed Jul. 19, 1989, mailed Aug. 9, 1989, PCT/US89/02335, PCT WO 1989/012376, published with international search report Dec. 14, 1989.

International Preliminary Report on Patentability Chapter I. issued Oct. 4, 2006, PCT/JP2005/005397.

Written Opinion of the International Search Authority, issued Oct. 4, 2006, PCT/JP2005/005397.

International Search Report, completed Jul. 5, 2005, mailed Jul. 26, 2005, PCT/JP2005/005397, PCT WO 2005/099313 A1, published with international search report Oct. 20, 2005.

Rogers Corporation, The world runs better with Rogers., Roger's Revolutionary DFLX™ Lamps and EL Drivers Gain Wide Market Acceptance as Cellphone Profiles Grow Thinner and Thinner, Release Date: Feb. 28, 2006.

Rogers Coporation, Durel Division, DUREL® DFLX®—T Flexible Electroluminescent Lamp Data Sheet, LIT-L9042 A01, ®2007 Rogers Coporation.

Electronicstalk, News for Electronic Engineers worldwide . . . updated daily, Lamps slim down to backlight handset keypad, The flexible DFLX electroluminescent lamp is used as the keypad backlight in the new Voq Professional Phone from Sierra Wireless, Product category: Other OEM Display Modules and Meters, News Release from: Rogers Corp, Subject: DFLX electroluminescent lamps, Edited by the Electronicstalk Editorial Team on Sep. 17, 2004, http://www.electronicstalk.com/news/rog/rog102.html, Jun. 23, 2008.

Lamps slim down to backlight handset keypad, The flexible DFLX electroluminescent lamp is used as the keypad backlight in the new Voq Professional Phone from Sierra Wireless, Product category: Other OEM Display Modules and Meters, News Release from: Rogers Corp, Subject: DFLX electroluminescent lamps, Edited by the Electronicstalk Editorial Team on Sep. 17, 2004.

Rogers Corporation, Durel Division, DUREL® Backlight IC Driver Product Selector Guide, LIT-B9002 A19, Revised Aug. 2006.

Dallas Business Journal—Mar. 14, 2005, http://dallas.bizjournals.com/dallas/stories/2005/03/14/smallb1.html Jun. 23, 2008 Dallas Business Journal, Friday, Mar. 11, 2005, License for growth, Oryon Technologies finds licensing its technology to already established companies gives it a boost in the market place, by Joyce Tsai Staff Writer.

http://www.oryontech.com/ Jun. 23, 2008 Oryon Technologies: Innovative Technology, Endless Possibilities . . . Innovative Technology. Infinite Possibilities.

* cited by examiner

FLEXIBLE ELECTROLUMINESCENT DEVICES AND SYSTEMS

The present application claims priority to U.S. Provisional Patent Application Ser. No. 61/008,115, filed Dec. 18, 2007, incorporated herein by reference in its entirety.

This invention was made with Government support under Contract Awards W911QY-05-C-0044 and W911QY-06-0059, awarded by the U.S. Army Natick Soldier Center, Natick, Mass. The Government has certain rights in the invention.

BACKGROUND OF THE INVENTION

The present invention relates to lighting devices. More particularly, the present invention relates to electroluminescent lighting devices having improved flexibility and reduced noise.

SUMMARY OF THE INVENTION

In one aspect, the present invention is directed to an electroluminescent device. The device includes a dielectric layer having a pigment and a binder. The pigment to volume concentration in the dielectric layer is greater than the critical pigment volume concentration.

In another aspect, the present invention is directed to an electroluminescent device. The electroluminescent device includes an intrinsically conductive polymer layer having a thickness of from about 0.1 to about 3 microns and an elongation less than about 100%; and a phosphor layer having a thickness from about 20 microns to about 70 microns. The electroluminescent device demonstrates a loss of brightness of less than about 10% after undergoing repeated creasing, crushing, flexing, twisting, abrading, and/or stretching.

In yet another aspect, the invention is directed to a flexible electroluminescent device including a rear electrode layer, a dielectric layer, a phosphor layer, a conductive layer comprising a conductive polymer, and a front electrode. The dielectric layer includes a pigment and a polymer, wherein the pigment to volume concentration is greater than the critical pigment volume concentration. Additionally, the conductive layer has a thickness of from about 1 to about 3 microns and an elongation less than about 100%, and the phosphor layer has a thickness from about 20 microns to about 70 microns. The electroluminescent device demonstrates a loss of brightness of less than about 10% after undergoing repeated creasing, crushing, flexing, twisting, abrading, and/or stretching.

In yet another aspect, the invention is a method of making a flexible electroluminescent device. The method includes depositing a flexible rear electrode layer on a flexible substrate, depositing a flexible dielectric layer adjacent the rear electrode and opposite the substrate. The dielectric layer includes at least a binder and a pigment and the pigment to volume ratio is greater than the critical pigment volume concentration. The method further includes depositing a flexible phosphor layer having a thickness from about 20 microns to about 75 microns adjacent the dielectric layer and opposite the rear electrode and depositing a conductive layer having an elongation less than about 100% adjacent the phosphor layer and opposite the dielectric layer. The method is conducted such that each layer has a different individual elongation break point and layers with longer elongation break points support adjacent layers such that the device substantially maintains brightness after undergoing mechanical stress.

These and other aspects of the invention will be understood and become apparent upon review of the specification by those having ordinary skill in the art.

DETAILED DESCRIPTION OF THE PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

In one aspect, the present invention is directed to an electroluminescent device. The electroluminescent device may be flexible and may include one or more of the following layers: a substrate, a primer, a rear electrode, a dielectric layer, a phosphor layer, an intrinsically conductive layer, a front outlining electrode, and a clear coat or overprint. Those having ordinary skill in the art will recognize that not all layers are necessary to the formation of the present device.

Figure 1:
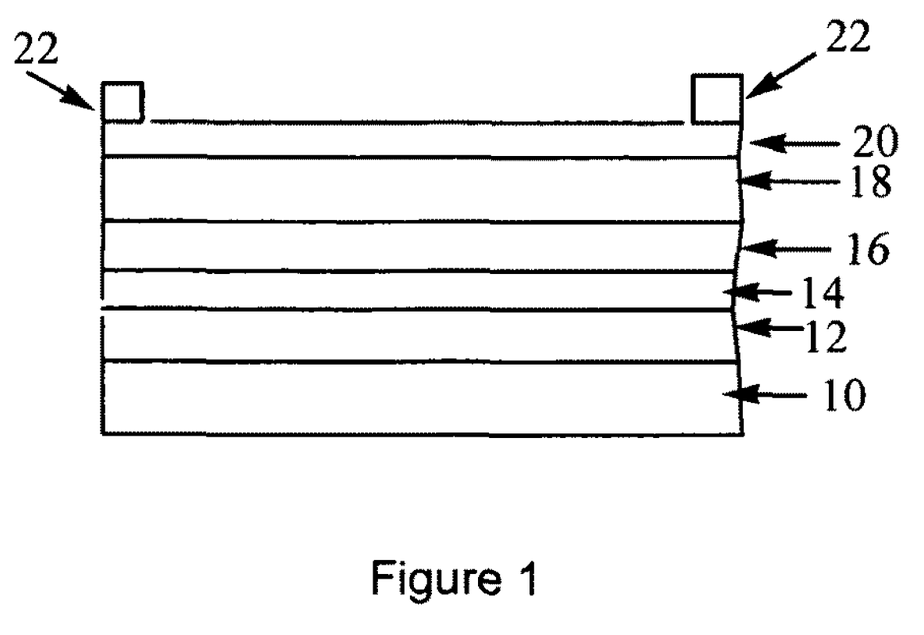
FIG. 1 is a schematic representation of an electroluminescent device in accordance with the present invention.

FIG. 1 is a schematic representation of an electroluminescent device in accordance with the present invention. The device depicted in FIG. 1 includes a substrate 10, a primer layer 12, a rear electrode 14, a dielectric layer 16, a phosphor layer 18, a transparent front electrode 20, and a front outlining electrode 22.

The present electroluminescent device may be formed by methods known in the art. An exemplary method for forming the present electroluminescent device includes screen printing each layer of the device.

When screen printing, an ink including at least the active component of a respective layer and a binder is formed. That ink is then passed through the screen and deposited onto the substrate or a previously printed layer. The ink may then be cured or dried to form the desired flexible layer of the present electroluminescent device.

In some embodiments, it may be desirable to cure or dry each layer after screen printing and before printing the next, adjacent layer. In other embodiments, it may be desirable to print more than one layer before curing the printed layers. In yet other embodiments, it may be desirable to print all layers before curing the device. In still other embodiments, it may be desirable to partially cure a layer before printing the subsequent layer.

Curing may be conducted via high temperature cure or drying, UV-cure, e-beam cure, or chemical curing. One having ordinary skill in the art would recognize the appropriate curing method based on the components of the layer or layers being cured. In some embodiments, more than one method of curing may be used on a single layer and/or on multiple layers.

The layers may be printed using one, two, three, or four printings for each layer. The layers may be printed through different mesh screens, depending on the particle sizes of the components in the various layers and the desired amount of ink to be printed.

Additionally, it may be desirable to partially cure a first layer and deposit a subsequent layer before the first layer is fully cured. This optional embodiment may allow for improved adhesion between layers.

Substrates contemplated as useful in the present device may be selected from one or more of paper, plastics, flexible ceramics, and textiles. In some embodiments, substrates including a woven fiber glass base may be exemplary. Other flexible substrates known in the art are also contemplated as useful in accordance with the present invention.

Exemplary substrates demonstrate a thermal stability of at least about 250° F. for about 2 minutes. An exemplary thickness of the substrate material is from about 0.05 mm to about 0.75 mm, in some embodiments from about 0.075 mm to about 0.2 mm.

Additionally, exemplary substrates should pass at least one vertical flame test selected from ASTM D6413, TM 5903 or FED-Std-191.

Each of the layers utilized in forming the present device may contain at least one binder. Exemplary binders contemplated as useful in accordance with the present invention are rubbers. Exemplary rubbers include one or more of olefinic rubbers, copolymers of butadiene and isoprene with ethylenically unsaturated monomers, copolymers of diene monomers, silicone rubbers, homopolymers, random copolymers, and block and graft copolymers of ethylene oxide, thermoplastic polyurethane rubbers, thermoplastic olefinic rubbers, acrylate, and methacrylate end-capped oligomers.

Rubbers are contemplated as useful binders in the present invention due to their high filler load, their high elastic modulus, and elongation at break as compared to higher Tg thermoplastic-based composites. Rubbers are typically low Tg polymers with minimal elongation at break of about 50%. Additionally, rubbers demonstrate good interlayer adhesion, high dielectric strength, flame retardant behavior, and water-repellency. Rubbers are also contemplated as useful due to their chemical and environmental stability.

Useful rubbers may be epoxidized or halogenated to produce binders with crosslinkable groups. Additionally, rubbers may be catalytically hydrogenated for production of binders having ameliorated mechanical strength and chemical resistance. The rubbers may additionally, or alternatively, be oxidized with ozone or periodic acid for production of binders with improved flow properties resulting from the lower molecular weight of the oxidized products.

Exemplary rubber materials suitable for binder formulations in the present device include olefinic rubbers obtained by homopolymerization or copolymerization of ethylenically unsaturated monomers such as, but not limited to, polyisobutylene, ethylene-propylene copolymer, static polypropylene, ethylene-vinyl acetate copolymer, norbornene-ethylene copolymer, ethylene-propylene-norbornene terpolymer, ethylene-propylene-diene terpolymer, ethylene-acrylate copolymers, and ethylene-propylene-acrylate terpolymers. These olefinic rubbers may optionally be modified with maleic anhydride to obtain binders having polar grafted groups. The presence of polar grafted groups may further improve adhesion and provide reactive sites for further crosslinking reactions. Additionally, the olefinic rubbers may be oxidized with peroxides or oxygen to produce binders with improved adhesion.

Copolymers of butadiene, isoprene, and respective derivatives with ethylenically unsaturated monomers with reactive or highly polar side groups may be useful to produce binders exhibiting improved adhesion, good dispersion auxiliary of fillers, and site for post-cure treatments, which may increase the mechanical strength and hardness of the binders, as well as the chemical and flame resistance of the binders.

Exemplary reactive monomers include, but are not limited to, acrylic methacrylic acids and respective salts, glycidyl methacrylate, hydroxyethyl methacrylate, styrene sulfonic acid, 2-carboxyethyl acrylate, 2-acrylamido-2-methyl-1-propenesulfonic acid, maleic anhydride, maleic and fumaric acid and respective semi-alkyl esters or semi-aryl esters or respective salts, methyl-vinyl ether, dimethylallylammonium chloride, acrylamide, polyethyleneglycol monoacrylate, polyethyleneglycol monomethacrylate, polypropyleneglycol nomoacrylate, polypropyleneglycol monomethacrylate, vinyl pyridine, sorbitol acrylate, glycerol acrylate, glycerol methacrylate, N-vinylpyrrolidone, 2-hydroxyethyle acrylate, vinyl acetate, N-acrylmorpholine, aminoethyl methacrylate, chloromethylstyrene, N,N-dialkylacrylamide (including $C_1$-$C_5$ alkyl groups), 2-(N,N-dimethylamino)ethyl acrylate, vinylphosphonic acid, dialkyl vinylphosphonate (including $C_1$-$C_{12}$ alkyl groups), 2-(2-ethoxy)ethyl acrylate, glycidyl acrylate, hydroxylpropyl acrylate, 3-methacryloxypropyltrialkyloxysiloxane (including $C_1$-$C_5$ alkyl groups), 2-propene-1-sulfonic acid, 2-sulfoalkyl acrylate, 2-sulfoalkyl methacrylate (each including $C_1$-$C_5$ alkyl groups), vinylbenzoic acid and respective salts, vinyl chloride, and N-vinylurea.

Copolymers of diene monomers, such as one or more of butadiene, chloroprene, and/or isoprene with ethylenically unsaturated fluorinated monomers, or monomers with fluorinated side chains may be useful to provide improved water-repellency, chemical resistance, and flame resistance. Exemplary monomers include, but are not limited to tetrafluoroethylene, perfluoropropylene, perfluorobutadiene, perfluoroisobutylene, perfluoroalkyl acrylate or methacrylate (including $C_1$-$C_{12}$ alkyl groups), perfluoroalkyl vinyl ether, and perfluoroalkyl esters of maleic and fumaric acids (including $C_1$-$C_{18}$ alkyl groups). Commercially available fluoroelastomers, such as VITON™ (Dupont Dow Elastomers), SIFEL™ (Shin-Etsu), DYNEON™ (3M), and TECNOFLON™ (Solvay Solexis) are also contemplated as useful in accordance with the present invention.

In some embodiments, it may be desirable to include silicone rubbers as binders in the present invention. Silicone rubber containing binder formulations may exhibit good environmental stability, low water permeability, low flammability, and high flexibility at low temperatures. Additionally, silicone rubbers may be produced by condensation of alkoxysilanes, carboxysilanes, or halosilanes in the presence of water. Alternatively, or additionally, these polymers may be obtained by ring opening polymerization of cyclic siloxane oligomers. Exemplary examples of silane and siloxane monomers include those having the general formulae:

$$(RO)_2SiR'_2 \text{ and/or } X_2SiR'_2,$$

wherein R and R' are independently selected from alkyl and aryl groups having from 1 to about 20 carbons, and X is at least one halogen.

Siloxane monomers with one or three polymerizable subunits may be utilized to control or increase, respectively, the molecular weight during polymerization of the silicone rubbers. Exemplary monofunctional or trifunctional monomers are represented by the following general formulae:

(RO)₃SiR' or X₂SiR' or ROSiR'₃ or XSiR'₃, wherein R and R' are independently selected from alkyl and aryl groups having from 1 to about 20 carbons, and X is at least one halogen.

Reactive and polar functional groups, such as epoxy, amines, and polyethylene oxide may be appended to the siloxane polymer chain by copolymerization or terpolymerization of functionalized silane monomers. These functional groups may improve the adhesion of the polysiloxane composites. In addition, they may provide reactive sites for post cure reactions, thereby increasing hardness, mechanical strength, and the solvent resistance of the present devices.

Exemplary silane monomers may be selected from one or more of methyltrichlorosilane, trimethylchlorosilane, dimethyldichlorosilane, ethyltrichlorosilane, methylvinyldichlorosilane, dimethylvinylchlorosilane, propyltrichlorosilane, n-butyltrichlorosilane, t-butyldimethylchlorosilane, phenyltrichlorsilane, phenylmethyldichlorosilane, diphenyldichlorosilane, n-hexyltrichlorosilane, n-octyldimethylchlorosilane, trimethylmethoxysilane, methyltrimethoxysilane, methylhydrogendimethoxysilane, methylhydrogendiethoxysilane, dimethyldimethoxysilane, dimethyldiethoxysilane, ethyltrimethoxysilane, ethyltriacetoxysilane, diisopropyldimethoxysilane, diisobutyldimethoxysilane, chloropropylemthyldimethoxysilane, chloroisobutylmethyldimethoxysilane, trifluoropropylmethyldimethoxysilane, phenylmethyldimethoxysilane, diphenyldiethoxysilane, cyclohexylmethyldimethoxysilane, cyclohexylethyldiethoxysilane, dicylocpentyldimethoxysilane, aminopropylmethyldieithoxysilane, aminoethylaminopropylmethyldimethoxysilane, aminoethylaminoisobutylmethyldimethoxysilane, glycidoxypropyltrimethoxysilane, glycidoxypropylmethyldimethoxysilane, glycidoxypropylmethyldiethoxysilane, and methylvinyldimethoxysilane.

Homopolymers, random copolymers, block and graft copolymers of ethylene oxide and its derivatives may also be used as binders in the present devices. These polymers may be produced by chain propagation of cationic or anionic species, resulting in polymers with controlled structure, such as narrow molecular weight distribution and eligible terminal reactive groups. These polymers may have enhanced solubility in polar organic solvents, resulting in ease of printing.

Additionally, the functional terminal groups (such as hydroxyl, amines, epoxy, carboxylic acid, etc.) may provide reactive sites for post-cure reactions, thereby improving the mechanical strength and hardness of the respective composites.

For example, a mixture of polypropylene glycol hydroxyl end-capped and blocked polyisocyanates may produce highly flexible films upon thermal cure. Reactive functional groups may also be appended along the polymer chain using functional oxirane monomers. Copolymers of ethylene oxide are contemplated due to their flexibility at low temperature and low tendency towards crystallization.

Epichlorohydrin based rubbers may be included in this class of binders. Due to their high chloride content, epichlorohydrin based rubbers may be used to enhance flame retardant properties of the resultant devices.

Exemplary oxirane monomers contemplated as useful include, but are not limited to, one or more of ethylene oxide, propylene oxide, chlorohydrin, bromohydrin, 2-alkyloxirane, 2,3-dialkyloxirane, glycidyl alkyl ether (each including $C_2$-$C_{18}$ alkyl groups), glycidol, glycidol alkyl and aromatic esters (such as glycidol acetate, stearate, or benzoate), 1,2-epoxy-3-phenoxypropane, glycidyltrimethylammonium chloride, benzyl glycidyl ether, styrene oxide, and glycidyl methacrylate.

Thermoplastic polyurethane rubbers (TPUR) are also contemplated as useful binders in accordance with the present invention. These polymers typically include short elastomeric segments of polyester, polyether, polyamide, polybutadiene, or respective copolymers, linked to short crystalline segments of aromatic or aliphatic-polyurethane, polyurea, polyallophanate, polyamide, or respective copolymers. These rubbers exhibit high elastic modulus, high elongation at break, and good tear strength. TPURs additionally include built-in physical crosslinks of the crystalline domains and, therefore, resemble vulcanates and thermosets at room temperature. TPURs can, however, be dissolved in polar organic solvents and may be thermally plasticized.

TPURs are available commercially under the ESTANE™ series from Noveon and as DESMOPAN™ from Bayer. Alternatively TPURs may be obtained by reacting polyisocyanates and their derivatives, such as allophanates and biurets, with polyols and/or polyamines. The reaction may be catalyzed by small quantities of tertiary amine bases, titanium, tin, zirconium, or aluminum organometals and salts. When polyamines are utilized as chain extenders, the reaction may proceed at about room temperature. When the chain extenders are diols, the reaction temperature is typically in the range of from about 60° C. to about 120° C.

Aliphatic isocyanates may be utilized due to their optical transparency and good UV stability. Aromatic isocyanates are also contemplated as useful.

Soft segments based on oligobutadiene units may be preferred due to their low water absorption and high elasticity.

TPURs based on polyester soft segments may exhibit low glass transition temperature and are less prone to crystallization than polyamide and polyether based soft segments. Soft segments composed of copolymers of polyester-polyether and polyamide-polyester are also contemplated as useful in conjunction with the present invention.

Exemplary polyisocyanates include one or more of hexamethylene-diisocyanate, isophorone diisocyanate, diphenylmethane diisocyanate, toluene diisocyanates, and the respective dimmers, trimers, polymeric, allophanate, and biuret versions thereof.

Exemplary polyols, polyamines, polyesters, and respective copolymers that may react with the polyisocyanates to produce flexible binder systems include, but are not limited to, one or more of polymers and copolymers obtained by step-growth polymerization of AB type monomers, such as caprolactone, caprolactame, α-hydroxy-γ-alkylene acids, α-amino-γ-carboxyl terminated polyethers, polyesters, polyamides, with aliphatic or aromatic chains, and with a molecular weight from about 100 to about 100,000, some embodiments from about 300 to about 2000. Such monomers may include, but are not limited to, one or more of 4-aminobutyric acid, 3-hydroxypropionic acid, 4-(2-hydroxyethyoxy) benzoic acid, and polyethyleneglycol monocarboxyl terminated monomers.

Additional exemplary precursors for TPURs include polymers and copolymers obtained by step-growth copolymerization of reactive AA and BB type monomers, such as, but not limited to, polyols, polyamines, polycarboxylic acids, and their respective anhydrides, esters, and halide derivatives.

Exemplary monomers of this type include, but are not limited to, one or more of oxalic acid, malonic acid, maleic acid, fumaric acid, succinic acid, adipic acid, azelaic acid, sebacid acid, and polyfunctional acids having alkyl, alkylene, aryl, polyester, polyether, and/or polyamide backbones with molecular weight in the range of from about 46 to about 100,000 g/mol, in some embodiments from about 46 to about 2000 g/mol.

These polyfunctional acids and/or their respective derivatives (anhydrides, esters, and/or carboxyl halides) may then be reacted with polyamines or polyols to form the desired telechelic polyester or polyamide for the production of the TPURs.

The polyamines or polyols, which react with the above acids and respective derivatives, may have a molecular weight in the range of from about 46 to about 2000 g/mol. Examples of exemplary polyamines and polyols include, but are not limited to, one or more of ethyleneglycol, propyleneglycol, glycerin, pentaeritritol, 1,4-butanediol, polyethyleneglyclol, polypropyleneglycol, hydroxyl-terminated polybutadiene, hydroxyl-terminated polycarprolactone, diethyleneglycol terephthalate, 1,4-bis(hydroxyethoxy)benzene, resorcinol, hydroquinone, castor oil, cathecol, cresol, ethylenediamine, phenylenediamine, and amino-terminated polycaprolactam.

Additionally, catalyzed transesterification at high temperatures of esters, or the alcoholysis of esters, or aminolysis of esters may be used to produce TPUR precursors. Suitable esters include alkyl, cycloalkyl, or aryl esters of the polycarboxilic acids described above. These esters may react with the diols and/or diamines described above to form telechelic oligoesters or oligoamides respectively.

Another advantage of TPUR binders in the possibility of formulating solventless inks capable of fast cures at high temperatures. For this purpose, it may be desirable to utilize blocked polyisocyanates instead of free polyisocyanates. Blocked polyisocyanates are less likely to react at room temperature, but as the temperature increases the blocked units are released, leaving free reactive isocyanate groups. At high temperatures, these free isocyanate groups may react quickly with the polyamines and polyols described above.

These prepolymer additives are often viscous liquids at room temperature, due to their relatively low molecular weight. Preceding the thermal temperature cure, a resilient solid thermoset coating may be produced using the prepolymer additives. The resultant binder composition is a solid, elastic coating composition. These binders have little to no volatile organic compound (VOC) emissions and fewer structural defects, such as pinholes, non-homogenous depositions, and mechanically stressed and segregated domains developed upon cure.

Thermoplastic olefinic rubbers (TPO) are also contemplated as useful binder compositions in accordance with the present invention. These TPO compositions may produce coatings with low oxygen and water-vapor permeability. Additionally, TPO composites exhibit good chemical and environmental stability. Typically, these rubbers are composed of rigid block or graft segments attached to soft block or graft segments. The rigid segments may be composed of one or more of polystyrene, linear polyethylene, and linear polypropylene units, while the soft segments may be composed of one or more olefinic rubbers, such as polybutadiene, polyisoprene, isobutylene, ethylene-propylene copolymers, and respective halogenated, hydrogenated, or oxidized derivatives.

Exemplary thermoplastic olefinic rubbers include, but are not limited to, one or more of poly(styrene-b-butadiene), poly(styrene-butadiene-b-styrene), poly(styrene-b-isobutylene-b-ethylene-b-styrene), poly(styrene-b-isobutylene-b-isoprene-b-styrene), and poly(styrene-b-isobutylene), and respective halogenated, hydrogenated, epoxidized, and maleic anhydride modified versions thereof.

In some embodiments of the present invention, each layer of the electroluminescent device may include the same binder. In other embodiments, each layer of the electroluminescent device may include a different binder than the other layers. In yet other embodiments of the present invention, at least one layer includes a different binder than the adjacent layers.

Each layer of the present invention may include solvent-based or solventless-based inks. Solvent based inks include at least a rubber binder, an organic solvent, and a ceramic powder or other organic electro-active additives.

Inks may include UV or e-beam curable oligomers. These oligomers may include polymerizable groups at the chain ends or appended randomly to the polymer backbone. These polymerizable groups may undergo crosslinking reactions under radiation cure promoted by photoinitiators.

Acrylate and methacrylate end-capped oligomers may be cured by a radical chain propagation mechanism to form the present inks. Derivatives of benzophenone, 2-hydroxy-alkyl-aryl ketones, and derivatives of arylphosphine oxide ketones may be utilized in the UV-curable formulations described herein. These compounds are recognized in the art as producing a high yield of radicals upon exposure to UV-A, UV-B, and UV-C radiation.

Exemplary initiators contemplated as useful to aid in the production of radicals include SARCURE™ and ESACURE™ from Sartomer, DAROCURE™ and IRGACURE™ from Ciba, FIRSTCURE™ from Albemarle, EBECRYL® from UCB, and other photoinitiators known in the art.

Additionally, synergistic photoinitiator additives may be utilized to improve the cure profile of thick coatings, such as organic peroxides and aromatic amines.

Vinyl ether and epoxy based oligomers may be cured by cationic chain propagation mechanisms, requiring photoacid generators. Photocatalysts that may be used to cure epoxy resins and multifunctional vinyl ether materials include, but are not limited to, one or more of aryldiazonium, triarylsulfonium, diaryliodonium, and aryoxonium salts.

Exemplary oligomers contemplated as useful for ink formulations in accordance with the present invention include, but are not limited to, one or more of aliphatic and aromatic acrylate-polyurethane, aliphatic and aromatic acrylate-polyester, aliphatic and aromatic acrylate end-capped epoxy resins, 3,4-epoxycyclohexylmethyl-3,4-epoxycylohexanone carboxylate, bis-(3,4-epoxycyclohexylmethyl)adipate, epoxidized oligobutadiene, epoxy end-capped poly(bisphenol-A-co-epichlorohydrin), copolymers of glycidyl acrylate and butadiene, isoprene, isobutylene, and derivatives with molecular weights in the range of from about 200-100,000, in some embodiments from about 500-about 2000. Hydrogenated, halogenated, and/or oxidized derivatives of the above oligomers are also contemplated as useful in accordance with the present invention.

Alternatively, or additionally, the UV or e-beam curable oligomers discussed above may be thermally cured by the use of radical initiators, thermal-acids, or by the addition of polyamines and/or polymercaptans.

Solventless based inks contemplated as useful in accordance with the present invention may include at least a low molecular weight rubber binder, as discussed above, a photoinitiator, and a ceramic powder or organic electroactive additive.

Other additives may be incorporated into the ink formulation, either solvent based or solventless, such as adhesion promoters, plasticizers, dispersion agents, crosslinkers, surfactants, leveling agents, antioxidants, and flowing agents.

One having ordinary skill in the art would recognize additives that would be useful in the present formulations based on those additives known in the art and their characteristics.

Additionally, a reactive diluent may be incorporated into the present inks to improve flow properties during the printing process. Exemplary diluents may include acrylates or epoxides. The diluent may be chemically incorporated to the polymer binder system upon cure.

In some embodiments, the present electroluminescent device may include a primer layer adhered to the substrate. The primer layer, where utilized, may serve to enhance adhesion of the electroluminescent device to the flexible substrate. Primers contemplated as useful in accordance with the present invention include one or more of high solids content primer inks, such as polyvinyl chloride, polyvinyl acetate, acrylic based plastisols, and other elastomers, such as polyurethane. Exemplary primers are those that may provide sealing and leveling of the substrate surface.

Additionally, the optional primer layer may include one or more of blocked isocyanates, polyols, and polyamines.

Additional components that may be included in the optional primer layer include one or more of flame retardants, cure promoters, adhesion promoters, and antioxidants. These fillers may be utilized to further improve the mechanical, chemical, and environmental stability of the device as a whole.

The present electroluminescent device further includes a rear electrode. The rear electrode may be directly adjacent the substrate. In some embodiments, the rear electrode may be directly adjacent a primer layer.

The rear electrode typically includes an active component including metal particles or conductive carbon black dispersed in a polymer matrix (binder). An exemplary metal is silver and/or a carbon-silver composite. In some embodiments, the conductive rear electrode inks may include from about 20% to about 95% by weight conductive fillers. In other embodiments, the conductive rear electrode inks may include from about 70% to about 85% by weight conductive fillers.

Conductive fillers contemplated as useful in accordance with the present invention include, but are not limited to, one or more of metal particles, metal flakes, metal microfibers, metal-plated plastic microbeads, metal-plated glass, metal-plated ceramic microbeads, metal-plated glass microfibers, conductive carbon black powder, conductive carbon microfibers, carbon nanotubes, and conductive metal plated microfibers.

Examples of conductive ceramic powders contemplated as useful in accordance with the present invention include, but are not limited to, one or more of indium-tin-oxide, fluoride-doped tin oxide, fluoride-doped zinc oxide, gallium-doped zinc oxide, aluminum-doped zinc oxide, antimonium-tin oxide, and zinc-tin oxide.

In some embodiments, it may be desirable to incorporate intrinsically conductive polymers (ICP) as the active additive to the rear electrode inks, either in combination with or in addition to the conductive fillers described above. Examples of exemplary conductive polymers include, but are not limited to, one or more of acid-doped polyaniline, acid-doped poly(ethylenedixoythiopnene), and acid-doped polypyrrol.

Exemplary acids that may be doped into the ICPs discussed above include, but are not limited to, one or more of polystyrene sulfonate, 1-anthracene sulfonic acid, 9-anthracene sulfonic acid, 2-phenanthrene sulfonic acid, 3-phenanthrene sulfonic acid, 9-phenanthrene sulfonic acid, $NO_2CF_3SO_3^-$, $CF_3SO_3H$, perfluoro octyl sulfonic acid, perfluoro octyl carboxylic acid, octylsulfonic acid, dodecylsulfonic acid, cetylsulfonic acid, toluenesulfonic acid (TsOH), $Fe(OTs)_3$, $Fe(CH_3SO_3)_3$, $(FSO_3)_2$, AgOTs, $CH_3SiOTs$, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfonic acid, camphor sulfinic acid, naphthalene trisulfonic acid, dodecylbenzene sulfonic acid, isethionic acid, 1,5-naphthalene disulfonic acid, nickel phthalocyanine tetrasulfonic acid, phenyl phosphonic acid, poly(vinyl sulfonic acid), 3-sulfopropyl acrylate, 3-sulfopropyl methacrylate, sulfamic acid, 5-sulfosalicylic acid, tiron (4,5-dihydroxy-1,3-benzene sulfonic acid), vinyl sulfonic acid, sulfanilic acid, 4-sulfophthalic acid, sulfoacetic acid, methyl orange, phenylphosphonic acid, dodecylbenzenesulfonic acid, sulfonated polystyrene, sulfonated poly(α-vinyl naphthalene), naphthol yellow, naphthol blue black, 1,2-naphthoquinone-4-sulfonic acid, naphthylazoxine S, 1-octane sulfonic acid, t-butyl phosphonic acid, ethyl phosphonic acid, butyl phosphonic acid, 1,2-benzene disulfonic acid, 4-octylbenzene sulfonic acid, 2-mesitylene sulfonic acid, 2,6-naphthalene disulfonic acid, 2-naphthalene sulfonic acid, 1,3,6-naphthalene trisulfonic acid, 1,3,7-naphthalene trisulfonic acid, sulfonazo III acid, biphenyl disulfonic acid, biphenyl sulfonic acid, 1,8-dihydroxynaphthalene-3,6-disulfonic acid, 3,6-dihydroxynaphthalene-2,7-disulfonic acid, 4,5-dihydroxynaphthalene-2,7-disulfonic acid, 6,7-dihydroxy-2-naphthalene sulfonic acid, 1-naphthalene phosphoric acid, 1-naphthalene sulfonic acid, 1-naphthalene-5,7-dinitro-8-hydroxy, 1-naphthalene-4-hydroxy sulfonic acid, 4-bromo benzene sulfonic acid, 4-hydroxy-5-isopropyl-2-methyl benzene sulfonic acid, 3,4-diamino benzene sulfonic acid, benzene phosphoric acid, 1,3,5-benzene trisulfonic acid, 2-methyl-5-isopropyl benzene sulfonic acid, 3,4-dinitro benzene sulfonic acid, 2-methoxy benzene sulfonic acid, 1-naphthalene-5-hydroxy sulfonic acid, 1-naphthalene 7-hydroxy sulfonic acid, dinonylnaphthalene sulfonic acid, p-toluene sulfonic acid, 1-naphthalene-3-hydroxy sulfonic acid, 2-naphthalene-1-hydroxy sulfonic acid, 4-phenylamino benzene sulfonic acid, and wherein M is a metal or non-metal cation, c is 1, 2, 3, or 4; d is 0, 1, or 2, f is 0, 1, or 2, g is 0, 1, or 2, e is 0, 1, or 2, and $R^6$ is nitro, cyano, hydroxy, halogen, alkoxy, phosphate, borate, carboxylate, substituted or unsubstituted aryl or alkyl having from 1 to about 30 carbon atoms wherein permissible substituents include perhaloalkyl, phenyl, alkoxy, halogen, cyano, haloalkyl, hydroxy, sulfonic acid, phosphoric acid, boric acid, sulfinate, sulfinic acid, carboxylic acid, nitro, carboxylate and the like, or any two $R^6$ substituents together may form an alkenylene chain completing a fused-ring system which chain may be unsubstituted or substituted with one or more halogen, phosphoric acid, hydroxy, boric acid, nitro, cyano, sulfinate, phosphoric acid, sulfinic acid, phosphate, carboxylate, phosphonic acid, phosphonate, sulfonate, borate, sulfonic acid or carboxylic acid groups, or $R^6$ is a moiety of the formula:

wherein q is a positive whole number from 1 to about 10.

Additionally, in some embodiments, the rear electrode may include more than one layer, with different conductive actives in each layer. For example, the rear electrode may include a first layer including silver and a second layer included in carbon.

In some embodiments, the rear electrode ink includes from about 5% to about 50% by weight rubber binder selected from the binders discussed above. In other embodiments, the rear electrode ink includes from about 10% to about 25% by weight rubber binder.

The rear electrode ink may optionally further include from about 5% to about 70% by weight solvent, in other embodiments, from about 20% to about 40% by weight solvent.

Exemplary solvents useful in the rear electrode ink include one or more of glycol ethers, diethylene glycol monoethylether, diethylene glycol monoethyl ether, and diethylene glycol mono-n-butyl ether.

Alternatively, the rear electrode may include a UV-curable rear electrode ink formulated with from about 40% to about 95% active ingredient selected from the active ingredients discussed above. In some embodiments, the UV-curable rear electrode ink may be formulated with from about 75% to about 85% by weight active ingredients.

When a UV-curable rear electrode ink is utilized, it may further include from about 20% to about 70% by weight of a UV-curable oligomer selected from the list of UV-curable oligomers set forth above, in some embodiments from about 10% to about 25%. The UV-curable rear electrode ink may further include from about 0.1% to about 10% by weight photoinitiator from the list set forth above, in other embodiments, from about 1-2% by weight photoinitiator.

The rear electrode layer may further include one or more additives selected from, but not limited to, quarternized ammonium salts, adhesion promoters, anticorrosion agents, flame retardants, and dispersion aids.

In exemplary embodiments, the rear electrode layer exhibits low electrical resistance. For example, in some embodiments, the electrical resistance of the rear electrode layer is from about $0.1\Omega/\square$ to about $20.0\Omega/\square$, in other embodiments, from about $10.0\Omega/\square$ to about $500.0\Omega/\square$.

The rear electrode layer may have a thickness from about 1 micron to about 500 microns, in some embodiments from about 1 micron to about 20 microns.

The present electroluminescent devices further include a dielectric layer. The dielectric layer may be adjacent to the rear electrode such that the rear electrode is situated between the substrate and the dielectric layer.

The dielectric layer serves to maintain a high electrical field across the present device, while also providing insulation against electrical shorts. Typically, the electro-optical efficiencies of electroluminescent devices may be proportional to the capacitance of the dielectric layer. Increasing the dielectric constant of this layer, therefore, also increases the device output. In exemplary embodiments, the dielectric layer exhibits low dielectric loss and a high dielectric breakdown voltage. These properties increase both light output efficiency and lifetime of the present electroluminescent devices.

The ink used to form the dielectric layer includes at least a high dielectric constant ceramic filler and a binder selected from the list set forth above. As used herein, the term "high dielectric constant" means a dielectric constant above the dielectric constant of silicon dioxide. Exemplary high dielectric constant ceramic fillers may include, but are not limited to, one or more of barium titanate, cerium oxide, zinc oxide, titanium dioxide, aluminum-doped zinc oxide, gallium-doped zinc oxide, tin oxide, indium-doped tin oxide, fluoride-doped tin oxide, manganese dioxide, tungsten trioxide, zirconium dioxide, strontium titanate, barium-strontium titanate, barium zirconate, barium zirconium titanate, lead zirconium titanate, and calcium copper titanate.

Where solvent-based inks are utilized in the dielectric layer, the layer may include from about 40% to about 95% by weight high dielectric constant ceramic, in some embodiments from about 75% to about 85% by weight high dielectric constant ceramic. The solvent based ink may further include from about 55% to about 60% by weight rubber binder selected from the list above, in some embodiments from about 20% to about 40% by weight rubber binder, and from about 10% to about 60% by weight solvent, in some embodiments from about 20% to about 50% by weight solvent.

Where UV-curable dielectric inks are utilized in the dielectric layer, the ink may include from about 40% to about 95% by weight high dielectric constant ceramic, in some embodiments from about 75% to about 85% by weight high dielectric constant ceramic. The UV-curable dielectric inks may further include from about 5% to about 70% by weight UV curable oligomer, in some embodiments from about 10% to about 25% by weight UV curable oligomer, and from about 0.1% to about 10% by weight photoinitiator, in some embodiments from about 1% to about 2% by weight photoinitiator.

The dielectric ink may further include one or more of cure promoters, adhesion promoters, antioxidants, dispersion aids, and flame retardant agents.

The dielectric layer may be from about 10 to about 40 microns in thickness, in some embodiments, from about 15 to about 25 microns.

In at least one embodiment, the pigment to volume concentration in the dielectric layer is greater than the critical pigment volume concentration.

Those having ordinary skill in the art will recognize that the pigment volume concentration is the amount of a particular pigment that can be added to a polymer. The point at which there is just sufficient binder to wet the pigment particles is known as the critical pigment volume concentration (CPVC). Below the CPVC there is sufficient binder for pigment wetting and above the CPVC there is not.

The inventors have discovered that by utilizing a pigment to volume concentration above the CPVC, the resultant device has reduced noise. Without being bound by theory, it is believed that this reduced noise is due to voids in the dielectric layer formed when the pigment to volume concentration is above the CPVC.

Those having ordinary skill in the art would expect these voids to result in a discontinuous layer, reducing light output and longevity of the device. The inventors discovered that the voids do not render such a result.

Pigment to volume concentration may be calculated according to the following formula:

$$PVC = 100 * V_{pigment} / (V_{pigment} + V_{binder}),$$

wherein $V_{pigment}$ is the pigment volume and $V_{binder}$ is the binder volume.

The dielectric active ingredient, for example, $BaTiO_3$, may be a piezoelectric material, meaning that when put into an electric field, the crystalline material changes shape to produce an audible noise. This is an explanation for why noise is common problem in capacitors and electroluminescent devices (which are considered a type of capacitor). The void spaces referenced above may serve to effectively contain the noise as the sound waves travel from one media to another and back again, thus absorbing the sound in the layer that generates the sound, rather than emitting the sound from the device.

The present electroluminescent devices further include a phosphor layer. The phosphor layer of the present devices is formed such that it is adjacent at least one side of the dielectric layer and is on the opposite side of the dielectric layer from the rear electrode.

As will be recognized by those having ordinary skill in the art, the phosphor layer is the light emitting layer of the present electroluminescent device. Phosphor particles known in the art are contemplated as useful in accordance with the present invention. Exemplary phosphor particles include, but are not limited to, one or more of doped zinc sulfide phosphors, but may also include complexes of one or more of calcium, strontium, barium, zinc, cadmium, and mercury with one or more of sulfur and selenium.

Exemplary dopants contemplated as useful in the formation of the present phosphor layer include, but are not limited to, one or more of manganese, copper, silver, lanthanides, and halogens.

Typical phosphor particles have a diameter of from about 5 microns to about 70 microns, in some embodiments from about 20 to about 40 microns.

In some embodiments, solvent-based inks may be utilized to form the present phosphor layer. Where solvent-based inks are utilized, the inks may contain from about 40% to about 85% by weight phosphor particles, in some embodiments from about 60% to about 85% by weight phosphor particles. The inks may further contain from about 5% to about 60% by weight rubber binder selected from the list set forth above, in some embodiments, from about 10% to about 40% by weight rubber binder. Additionally, the solvent-based inks may include from about 5% to about 70% by weight solvent selected from the list set forth above, in some embodiments, from about 10% to about 40% by weight solvent.

In other embodiments, a solvent-less ink may be utilized to form the present phosphor layers. In these embodiments, the ink may include from about 70% to about 90% by weight phosphor, in some embodiments from about 75% to about 85% by weight phosphor. The solvent-less ink may further include from about 10% to about 50% by weight UV-curable rubber oligomer selected from the list set forth above, in embodiments, from about 20% to about 30% by weight UV-curable rubber oligomer. The inks may further include from about 0.1% to about 10% by weight photoinitiator selected from the list set forth above, in some embodiments, from about 1% to about 5% by weight photoinitiator.

The phosphor ink may further include additional additives, such as, but not limited to, one or more of fluorescent dyes and pigments, surfactants, wetting agents, flame retardants, and adhesion promoters.

The phosphor layer may be between about 20 and about 75 microns thick, in some embodiments, between about 30 and about 70 microns thick.

The present electroluminescent devices further include a front electrode. The front electrode may be adjacent the phosphor layer such that the phosphor layer is located between the front electrode and the dielectric layer.

Exemplary front electrodes exhibit high electrical conductivity and visible light transmittance greater than about 80%. Exemplary inks utilized for forming the front electrode may include submicron-sized or nano-sized conductive and transparent conductive ceramics. Conductive ceramics contemplated as useful in accordance with the present invention include, but are not limited to, one or more of indium-tin oxide, antimonium-tin oxide, aluminum-doped zinc oxide, gallium-doped zinc oxide, fluoride-doped tin oxide, titanium nitride, and copper-gallium oxide.

When solvent-based inks are utilized to form the front electrode, the ink may contain from about 40% to about 95% by weight conductive ceramics, in some embodiments from about 60% to about 75% by weight conductive ceramics. The inks may further include from about 5% to about 60% by weight rubber binder, selected from the list above, in some embodiments, from about 20% to about 40% by weight rubber binders. Additionally, the inks may include from about 0% to about 70% by weight solvent selected from the list above, in some embodiments, from about 10% to about 40% by weight.

Where solvent-less inks are utilized, the ink may contain from about 70% to about 95% by weight conductive ceramics, in some embodiments from about 75% to about 85% by weight conductive ceramics. The inks may also include from about 5% to about 50% by weight UV-curable rubbers selected from the list above, in some embodiments from about 20% to about 30% by weight UV-curable rubbers. Additionally, the inks may include from about 0.1% to about 10% by weight photoinitiator, in some embodiments from about 1% to about 5% by weight photoinitiator.

Alternatively, or in addition, the front electrode may include intrinsically conductive polymers (ICP). ICPs may be utilized to provide improved mechanical flexibility and optical transparency as compared to the use of conductive ceramics alone in the front electrode.

Exemplary ICPs include, but are not limited to, one or more of acid-doped polyaniline, acid-doped poly(ethylenedioxythiophene), and acid-doped polypyrrol. Exemplary acid dopants include, but are not limited to, one or more of 1-anthracene sulfonic acid, 9-anthracene sulfonic acid, 2-phenanthrene sulfonic acid, 3-phenanthrene sulfonic acid, 9-phenanthrene sulfonic acid, $NO_2CF_3SO_3^-$, $CF_3SO_3H$, perfluoro octyl sulfonic acid, perfluoro octyl carboxylic acid, octylsulfonic acid, dodecylsulfonic acid, cetylsulfonic acid, toluenesulfonic acid (TsOH), $Fe(OTs)_3$, $Fe(CH_3SO_3)_3$, $(FSO_3)_2$, $AgOTs$, $CH_3SiOTs$, dodecylbenzene sulfonic acid, naphthalene sulfonic acid, benzene disulfonic acid, benzene sulfonic acid, 1,3-benzene disulfonic acid, 2,5-dihydroxy-1,4-benzene disulfonic acid, camphor sulfonic acid, camphor sulfinic acid, naphthalene trisulfonic acid, dodecylbenzene sulfonic acid, isothonic acid, 1,5-naphthalene disulfonic acid, nickel phthalocyanine tetrasulfonic acid, phenyl phosphonic acid, poly(vinyl sulfonic acid), 3-sulfopropyl acrylate, 3-sulfopropyl methacrylate, sulfamic acid, 5-sulfosalicylic acid, tiron (4,5-dihydroxy-1,3-benzene sulfonic acid), vinyl sulfonic acid, sulfanilic acid, 4-sulfophthalic acid, sulfoacetic acid, methyl orange, phenylphosphonic acid, dodecylbenzenesulfonic acid, sulfonated polystyrene, sulfonated poly(α-vinyl naphthalene), naphthol yellow, naphthol blue black, 1,2-naphthoquinone-4-sulfonic acid, naphthylazoxine S, 1-octane sulfonic acid, t-butyl phosphonic acid, ethyl phosphonic acid, butyl phosphonic acid, 1,2-benzene disulfonic acid, 4-octylbenzene sulfonic acid, 2-mesitylene sulfonic acid, 2,6-naphthalene disulfonic acid, 2-naphthalene sulfonic acid, 1,3,6-naphthalene trisulfonic acid, 1,3,7-naphthalene trisulfonic acid, sulfonazo III acid, biphenyl disulfonic acid, biphenyl sulfonic acid, 1,8-dihydroxynaphthalene-3,6-disulfonic acid, 3,6-dihydroxynaphthalene-2,7-disulfonic acid, 4,5-dihydroxynaphthalene-2,7-disulfonic acid, 6,7-dihydroxy-2-naphthalene sulfonic acid, 1-naphthalene phosphoric acid, 1-naphthalene sulfonic acid, 1-naphthalene-5,7-dinitro-8-hydroxy, 1-naphthalene-4-hydroxy sulfonic acid, 4-bromo benzene sulfonic acid, 4-hydroxy-5-isopropyl-2-methyl benzene sulfonic acid, 3,4-diamino benzene sulfonic acid, benzene phosphoric acid, 1,3,5-benzene trisulfonic acid, 2-methyl-5-isopropyl benzene sulfonic acid, 3,4-dinitro benzene sulfonic acid, 2-methoxy benzene sulfonic acid, 1-naphthalene-5-hydroxy sulfonic acid, 1-naphthalene 7-hydroxy sulfonic acid, dinonylnaphthalene sulfonic acid, p-toluene sulfonic acid, 1-naphthalene-3-hydroxy sulfonic acid, 2-naphthalene-1-hydroxy sulfonic acid, 4-phenylamino benzene sulfonic acid, and wherein M is a metal or non-metal cation, c is 1, 2, 3, or 4; d is 0, 1, or 2, f is 0, 1, or 2, g is 0, 1, or 2, e is 0, 1, or 2, and $R^6$ is nitro, cyano, hydroxy, halogen, alkoxy, phosphate, borate, carboxylate, substituted or unsubstituted aryl or alkyl having from 1 to about 30 carbon atoms wherein permissible substituents include perhaloalkyl, phenyl, alkoxy, halogen, cyano, haloalkyl, hydroxy, sulfonic acid, phosphoric acid, boric acid, sulfinate, sulfinic acid, carboxylic acid, nitro, carboxylate and the like, or any two $R^6$ substituents together may form an alkenylene chain completing a fused-ring system which chain may be unsubstituted or substituted with one or more halogen, phosphoric acid, hydroxy, boric acid, nitro, cyano, sulfinate, phosphoric acid, sulfinic acid, phosphate, carboxylate, phosphonic acid, phosphonate, sulfonate, borate, sulfonic acid or carboxylic acid groups, or $R^6$ is a moiety of the formula:

wherein q is a positive whole number from 1 to about 10.

Those having ordinary skill in the art will appreciate that a front electrode layer including an ICP ink typically does not possess good flexibility and elongation. The inventors discovered that when an ICP thickness of from about 0.3 to about 5.0 is coupled with a phosphor layer thickness of from about 25 to about 50, the layers develop a symbiotic relationship, whereby the flexibility and elongation of the phosphor layer supports the ICP layer to provide sufficient flexibility. Stated differently, the thickness ratio of the ICP layer to the phosphor layer may be from about 1:5 to about 1:125.

If the ICP layer is too thick in comparison to the phosphor layer, then the ICP layer is too brittle and the life cycle and light output of the device is significantly decreased. If the ICP layer is too thin in comparison to the phosphor layer, the efficiency of the device is significantly decreased, leading to poor light output and short life cycles.

In some embodiments, an additional layer, including an intrinsically conductive polymer, may be utilized. This layer may be located between the phosphor layer and the front electrode layer. When such a layer is utilized, the front electrode layer will include conductive ceramics.

The present device may further include a seal coat that seals the device against moisture. The seal coat may be located on the surface of the device. Alternatively, or additionally, the seal coat may be located on the back of the substrate. Seal coat compositions may be selected from, but not limited to, one or more of aliphatic and aromatic acrylate-polyurethane, aliphatic and aromatic acrylate-polyester, aliphatic and aromatic acrylate end-capped epoxy resins, 3,4-epoxycyclohexylmethyl, 3,4-epoxycyclohexanone carboxylate, bis-(3,4-epoxycyclohexylmethyl)adipate, epoxidized oliobutadiene, epoxy end-capped poly(bisphenol-A-co-epichlorohydrin), copolymers of glycidyl acrylate and butadiene, isoprene, isobutylene, and derivatives thereof.

Exemplary seal coats will increase the moisture resistance of the device while having little to no impact on the light output of the device.

Additionally, a barrier layer may be situated between the phosphor layer and the front electrode. The barrier layer may aid in protection of the front electrode.

Exemplary barrier layers should be sufficiently transparent that light output of the device is not significantly affected through absorption or internal reflection. Electronically, the layer should not reduce the electric field significantly to reduce the light emitted from the device.

Exemplary barrier layers may be printed from inks including a binder and solvent and/or photoinitiator in addition to the barrier compound. Exemplary barrier compounds may be selected from one or more of gallium doped zinc oxide, indium-tin-oxide, fluoride-doped tin oxide, fluoride-doped zinc oxide, aluminum-doped zinc oxide, antimonium-tin oxide, zinc-tin oxide, and like materials.

In some embodiments, an overprint of a down conversion layer may be situated between the phosphor layer and the front electrode. The down conversion layer, when utilized, may include one or more of phosphors, dyes, pigments, fluorescent materials, phosphorescents, or other materials (organic, inorganic, or organometallic) that may absorb short wavelengths of light and emit longer wavelengths of light. These materials are not activated by the electrical field of the device, but absorb some portion of the emissions from the phosphor in the phosphor layer and re-emit that energy as light of a longer wavelength than the wavelength of the light emitted by the phosphor particles in the phosphor layer.

Each layer of the present device should include at least three properties, (1) optical properties, (2) electrical properties, and (3) mechanical properties. Those having ordinary skill in the art will recognize the optical and electrical properties of the various layers.

For example, the optical properties may be reflective, emissive, transparent, translucent, and/or blocking properties. The electrical properties may be conductive, emissive, insulating, and/or charge ejection properties. These properties are common to devices known in the art.

The present device further incorporates mechanical properties in the various layers. By incorporating these advantageous mechanical properties, the present device achieves greater flexibility than prior electroluminescent devices, while maintaining efficiency, light out-put, and device lifetime.

As briefly discussed above, not all individual layers of the present device possess good elongation. For example, the layers containing ICP tend to, when printed alone, possess poor elongation and flex. When printed as a part of the composite of the present device, however, the other layers provide support to the ICP-containing layers such that the device as a whole has the desired flexibility.

The flexibility of the present electroluminescent devices may be measured using the Gelbo Flex test procedure set forth in ASTM F392 for 25-100 cycles. Advantageously, lamps produced according to the present invention demonstrated a drop in brightness of less than about 10% after 100 cycles of the Gelbo test. This result indicates that creases, breaks, and/or delamination of the layers do not occur despite repeated creasing, crushing, flexing, twisting, abrading, and/or stretching.

Because the various layers of the present device work together as a composite, the present device demonstrates superior flexibility as compared to devices known in the art. For example, although some of the layers would not individually pass the Gelbo test, when those layers are a part of the present composite, they receive support from the other layers, allowing the device as a whole to pass the Gelbo test. Stated differently, even though some individual layers would suffer from creases and breakage if creased, crushed, flexed, twisted, abraded, or stretched, these devices do not suffer these failures when they are incorporated as a component of the present device and subjected to the mechanical strains.

Those having ordinary skill in the art will recognize that electroluminescent devices known in the art do not possess these mechanical properties. The various layers of electroluminescent devices known in the art are printed at different thickness ratios, ink component proportions, and/or different orders. These distinctions result in devices that are unable to maintain their efficiency, light out-put, and lifetime after being repeatedly creased, crushed, flexed, twisted, abraded, or stretched.

The present device is contemplated as useful for providing illumination in a variety of locations that would benefit from such illumination. The device may be used in standard structures, such as commercial and residential buildings.

Additionally, the present device may be used to illuminate structures and locations that are typically considered difficult to illuminate. For example, the present device may be used in structures having at least one soft-wall. The present devices may be mounted onto the soft-wall in such structures. Non-limiting examples of structures including at least one soft wall include tents, canopies, automobiles, airplanes, and boats. Those having ordinary skill in the art will appreciate such structures are often difficult to illuminate due to the bulky size and weight of traditional lighting devices. For example, it is difficult to mount traditional light sources in tents due to their size and weight.

The present device may be utilized in such structures due to its minimal thickness, light weight, and flexibility. As a non-limiting example, the present device may be mounted in a tent and then remain mounted to the tent wall when the tent is packed. Traditional lighting devices utilized in tents must be removed from the tent before the tent is packed. Separate storage is also required for such traditional lighting, taking up valuable space and adding weight to items to be transported.

Additionally, due to the flexibility of the present device, the structure on which the device is mounted may be folded, twisted, stretched, and/or crushed with little to no effect on the light output, efficiency, and life of the device.

The present electroluminescent devices are conformable and may, therefore, be mounted on surfaces having various shapes. For example, the devices may be mounted on surfaces that are flat, angular, curved, and/or bent. The devices may also be mounted such that they are mounted into or around a corner or around a curved edge. Moreover, the device may be mounted parallel to the ground, perpendicular to the ground, or any angle in-between without significant loss of light output, efficiency, and/or lifetime.

The present device may be mounted to various surfaces by mounting devices known in the art. For example, the device may be mounted by one or more of hook and loop, nails, adhesives, ties, staples, clips, grommets, hooks, and screws. Other mounting devices and methods known in the art are also contemplated as useful in accordance with the present invention.

Due to the conformable nature of the present devices, the devices may be mounted such that the device extends less than one centimeter from the structure or wall on which it is mounted. This close mounting provides uniform illumination and reduces shadows as compared to traditional lighting devices that are mounted such that the light is emitted some distance from the wall or structure. Stated differently, the present devices are mounted such that the light may emitted less than one centimeter from the wall or structure on which the device is mounted.

Figure 2:
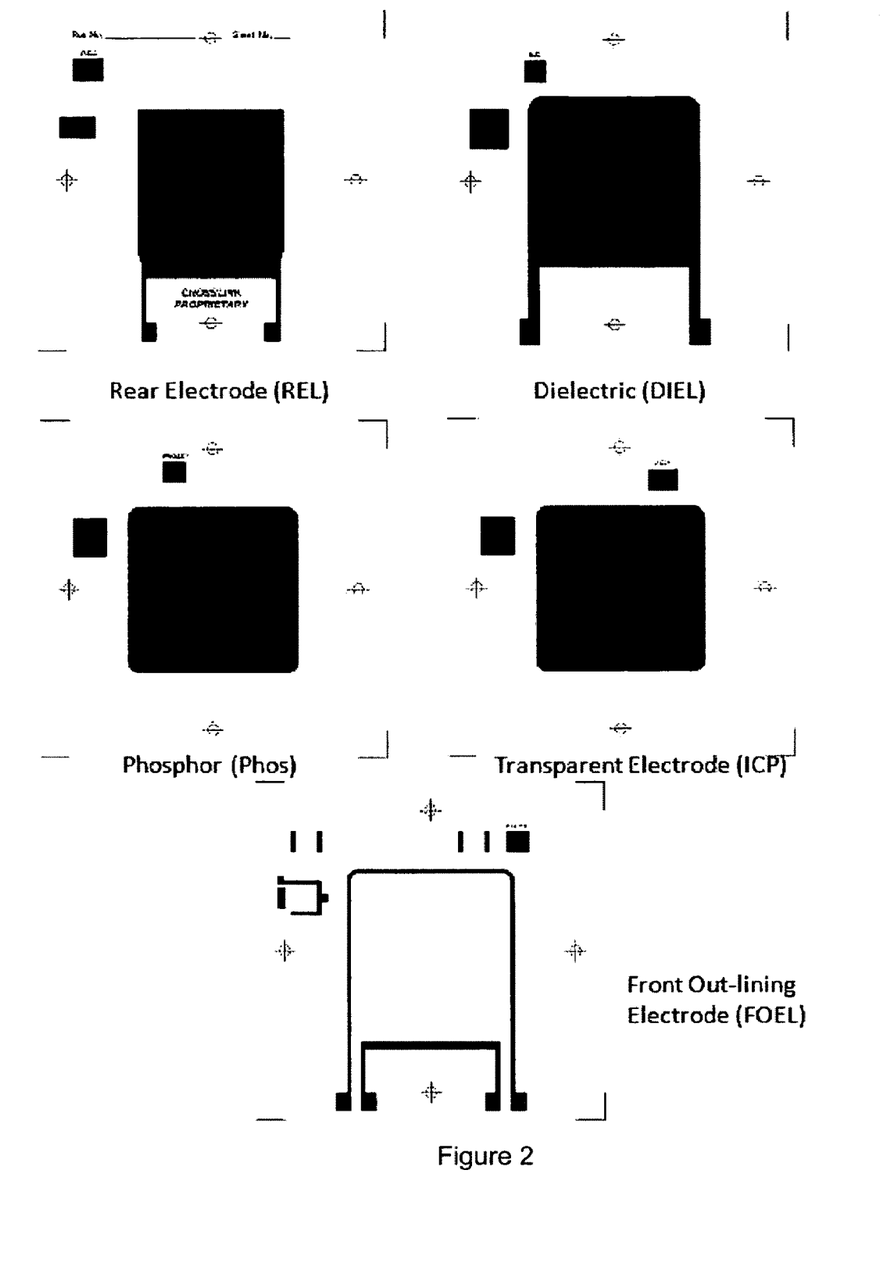
FIG. 2 is a representation of a design of a 25 in$^2$ electroluminescent device in accordance with the present invention.

FIG. 2 is a representation of an exemplary build of a 25 in$^2$ electroluminescent device in accordance with the present invention. The device includes a rear electrode layer 30 with conductive tabs 32 for attaching an electrical lead, a dielectric layer 34, a phosphor layer 36, a transparent (ICP) electrode layer 36, and a front outlining electrode 38 with conductive tabs for attaching an electrical lead. The layers are printed one on top of the other in the shapes shown in FIG. 2.

Figure 3:
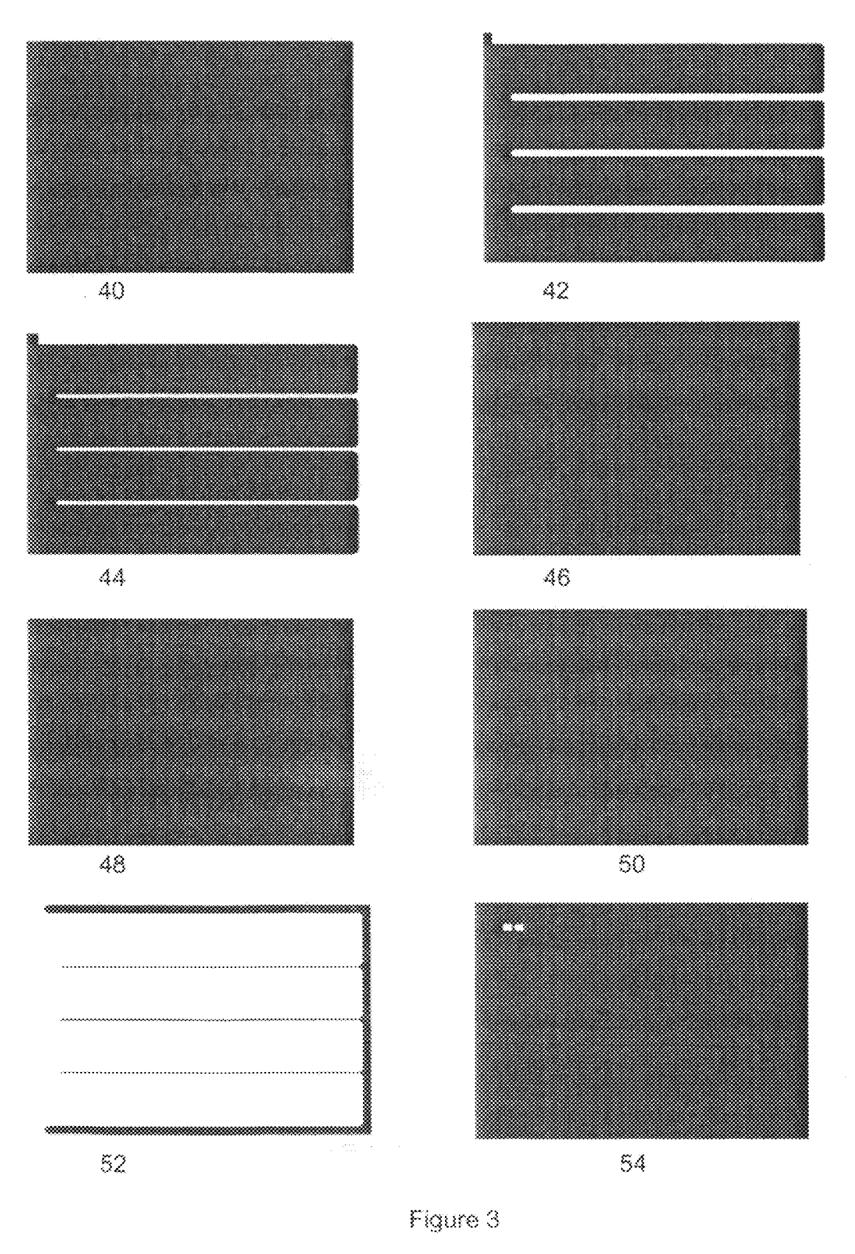
FIG. 3 is a representation of a design of a 565 in$^2$ electroluminescent device in accordance with the present invention.

FIG. 3 is a representation of an exemplary build of a 565 in$^2$ electroluminescent device in accordance with the present invention. The device includes a primer layer 40, a rear electrode layer 42, an additional rear electrode layer 44, a dielectric layer 46, a phosphor layer including an ICP 48, a front outlining electrode 50, and a clear coat/encapsulating layer 52. The layers are printed one on top of the other in the shapes shown in FIG. 3.

The inventors discovered that the large capacitance and large sheet resistance of layers including ICPs may play a role in decreasing brightness homogeneity across the surface of the present device, i.e., brown-outs. To reduce the electrical resistance of the ICP layers and prevent such brown-outs, the intricate chemistry associated with the transparent conductive ink technology may need to be reengineered.

Reducing the capacitance of the device, such as by increasing the thickness or changing the chemistry of the dielectric layer may address this problem. The trade-off, however, is reduced brightness because of reduced electrical field across the lamp.

The inventors discovered that the brownout effect may be minimized by splitting the large device area into smaller areas. To address this issue, conductive traces were printed on top of layers containing ICP layers. The print design is depicted in FIG. 3.

When the distance between the traces is too large, the device efficiency proportionally decreased, increasing the brownout effect. When the distance between the traces is too small, too much light is blocked, decreasing the light output of the device.

The inventors discovered that by strategically placing the traces on the ICP layers, the distance of travel required by the electrons through the ICP layer is reduced (due to reduction of the resistance of the ICP layer) and the light output and device efficiency are improved.

In some embodiments, the present device may be one component of a lighting system. In these embodiments, the lighting system may include the present device, connectors for connecting the device to a power supply, a harness, and/or a power source.

The present system may include novel power connectors, for connecting the present device to a power supply. The connectors may be attached to the device in such a way to make the connection permanent, semi-permanent, or temporary.

In some embodiments, the device may include a conductive tab, for example a silver tab, to which the connectors may be attached. The connectors may be in the form of rivets, barbed terminals with a clamshell assembly, and/or crimped terminals with a clamshell assembly.

Where the connectors are in the form of rivets, a pop rivet may be used to secure a ring terminal, which has been attached to the end of an electrical lead, to the conductive tabs on the device. The rivets are mechanical fasteners that maintain contact between the surface of the ring terminal and the conductive tab, ensuring electrical connection.

Where the connectors are in the form of barbed terminals with a clamshell assembly, a pair of barbed terminals may be attached (for example, soldered) to the ends of the electrical leads. The barbed terminals may be thin, flat, rectangular terminals that have barbs on at least one surface. These barbs may pierce through the conductive tabs and into the substrate of the device. This enables a substantially planar surface of the terminal to remain in contact with the conductive tab, thereby maintaining an electrical connection. The clamshell assembly (described further below) may further support the electrical connection.

Where the connectors are in the form of crimped terminals with a clamshell assembly, the terminals may be attached (for example, soldered), to the ends of the electrical leads. When viewed from the side, the terminal may resemble an inverted "V" (for example, <). The conductive tabs of the device may be placed within the opening of the terminal and the terminal may then be crimped or crushed to close the opening, thereby maintaining electrical contact between the lead and the conductive tab. Additionally, there may be barbs located in the terminal to hook into the substrate and aid in maintaining the connection.

The clamshell assembly referenced above may take the form of two pieces of non-conductive material with strips of viscous material (for example, a tar-like material) adhered to one surface of each piece of material. One piece of the material may be placed over the lead connections on top of the substrate and the other underneath the lead and opposite the substrate. The two pieces of material may be attached to one another by fasteners known in the art including, but not limited to, screws, clips, and hook and loop connectors. A notched cutout in each piece of material may accommodate a strain relief which may be molded onto the electrical cable. The clamshell assembly may serve to protect and insulate the lead terminals.

The present system may further include a cable harness assembly. The cable harness assembly may be used to connect each device via its own electrical cord to a power supply. The harness may include a length of two conductor cables with connectors for mating each device's electrical cord to the conductor cables. The conductor cables may further include attachment devices for attaching the conductor cables to the power supply. Electrical attachments known in the art are contemplated as useful for attaching the cords to the power supply.

The present system may further include a power source. The power source provides electrical power to illuminate the present devices. The present devices are AC-driven electroluminescent devices. Accordingly, the devices require a constant change in polarity of current. The drive signal may be a square wave or a sinusoidal wave with a typical frequency of greater than about 400 Hz.

The power supply may be a fixed source, with frequency and voltage held at a substantially constant level. When the present devices are powered by this form of power supply, a gradual decay in light output may occur, with the device becoming dimmer over time.

Other power sources may be utilized to improve the operational lifetime of the present devices, two of which are described below. Each of these power sources may compensate for a decrease in light output as the device ages by automatically increasing drive voltage applied to the device. As the device ages, the impedance of the device increases. This change in impedance allows the power supplies to adjust their outputs accordingly.

One alternative power source is a resonant power source. When the device is powered with a resonant inverter, the device itself may be considered a component of the circuit. The device may serve as the capacitive section of a series L-C circuit. As the impedance of the lamp increases with age, the voltage across the lamp will also increase according to Ohm's Law, thereby maintaining a substantially constant light output as the device ages.

An additional alternative power source is a Class D Pulse Width Modulation Source. This form of power supply can be configured to what is considered a constant current source. As the name implies, the output current is fixed and the voltage is variable. When the present device is connected to this form of power supply, the fixed current may allow for the voltage to drop across the device proportional to the device's impedance. Again following Ohm's Law, as the device ages and the impedance increases, the voltage will increase at the same rate.

The following examples describe preferred embodiments of the invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples all percentages are given on a weight basis unless otherwise indicated.

EXAMPLE 1

This example sets forth one embodiment of an ink that may be utilized to print the rear electrode layer.

| Component | Amount |
|---|---|
| Silver flakes (particle size 1-3 microns) | 65 g |
| Silver powder (particle size 300-800 microns) | 20 g |
| Poly(styrene-b-isobutylene-b-styrene), maleic anhydride modified | 15 g |
| p-Cymene | 6 g |
| 2-butoxy-ethanol | 4 g |
| Lubrizol 2062 (phosphate adhesion promoter, Noveon) | 2 g |

The ink is screen-printed onto a substrate and then cured using a forced air dryer at 250° F. for about 4 minutes.

EXAMPLE 2

This example sets forth one embodiment of an ink that may be utilized to print the dielectric layer.

| Component | Amount |
| --- | --- |
| Barium titanate (particle size 0.5-3.0 microns) | 85 g |
| Polychloroprene (neoprene WB, Dupont Dow Elastomers) | 20 g |
| p-Cymene | 60 g |
| Solsperse 26000 (dispersion aid, Noveon) | 1 g |
| 3-aminopropyl(diethoxymethylsilane) (adhesion/cure promoter) | 2 g |
| Tris(nonylphenyl)phosphite (antioxidant) | 2 g |

The ink is screen-printed onto either a substrate or a primer layer and then cured using a forced air dryer at 260° F. for about 3 minutes.

EXAMPLE 3

This example sets forth one embodiment of an ink that may be utilized to print the phosphor layer.

| Component | Amount |
| --- | --- |
| Green-emitting phosphor GG45 (Sylvanyia Osram) | 80 g |
| Poly(acrylonitrile-co-butadiene-co-acrylic acid), dicarboxy terminated, glycidyl methacrylate diester (Aldrich) | 20 g |
| PolySurF HPL (flame retardant monomer, ADD APT) | 5 g |
| Photoinitiator mixture (SR1135, Sartomer) | 2 g |

The ink is screen-printed onto the dielectric layer and then cured using a UV-A cure at 1 J/cm$^2$.

EXAMPLE 4

This example sets forth one embodiment of an ink that may be utilized to print the front electrode layer.

| Component | Amount |
| --- | --- |
| Bayhdrol P240 (water-dispersed polyurethane rubber, Bayer) | 10 g |
| Baytron SV3 (PEDOT-PSS dispersion, H C Starck) | 100 g |
| Poly(sorbitol acrylate) | 2 g |
| Propyleneglycol | 50 g |

The ink is screen-printed onto the phosphor layer and then cured using a forced air dryer at 240° F. for about 5 minutes.

EXAMPLE 5

Two 25 in$^2$ lamps were printed using standard print conditions and the inks set forth in the table below. A coated woven fiberglass substrate was utilized as the base for the lamps.

| Printed Layer | Ink | Ink |
| --- | --- | --- |
| Rear Electrode | Silver Ink | Silver Ink/Carbon |
| Dielectric | Dielectric ink | Dielectric ink |
| Phosphor | Phosphor ink | Phosphor ink |
| Transparent electrode | ICP Ink | ICP Ink |
| Front Electrode Encapsulating Layer | Silver Ink Clear Coat or Overprint Inks | Silver Ink Clear Coat or Overprint Inks |

The testing results of the lamps described in the table above are set forth below:

| | | |
| --- | --- | --- |
| cd/m$^2$ | Mean | 133.9 |
| | Std. Dev. | 2.2 |
| Total Lumens | Mean | 6.14 |
| | Std. Dev. | 0.09 |
| TP Efficiency (Lumen/W) | Mean | 1.77 |
| | Std. Dev. | 0.06 |
| General CRI | Mean | 80.3 |
| | Std. Dev. | 0.2 |
| Color Temp | Mean | 4479 |
| | Std. Dev. | 38 |

All references cited in this specification, including without limitation all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinency of the cited references.

In view of the above, it will be seen that the several advantages of the invention are achieved and other advantageous results obtained.

As various changes could be made in the above methods and compositions without departing from the scope of the invention, it is intended that all matter contained in the above description and shown in the accompanying drawings shall be interpreted as illustrative and not in a limiting sense.

What is claimed is:

1. An electroluminescent device comprising:
    a substrate layer;
    a rear electrode layer;
    a dielectric layer;
    a phosphor layer having a thickness from about 20 microns to about 70 microns; and
    an intrinsically conductive layer comprising an intrinsically conductive polymer, wherein the intrinsically conductive layer has a thickness of from about 0.3 to about 5 microns and an elongation less than about 100%.

2. The electroluminescent device according to claim 1, wherein the intrinsically conductive layer comprises one or more of acid doped polyaniline, acid doped poly(ethylenedioxythiophene), and acid doped polypyrrol.

3. The electroluminescent device according to claim 1, wherein the phosphor layer includes one or more phosphors selected from one or more of complexes of calcium, strontium, barium, zinc, cadmium and mercury with one or more of sulfur or selenium.

4. The electroluminescent device according to claim 1, wherein the phosphor layer includes phosphor particles having a diameter of from about 20 to about 40 microns.

5. The electroluminescent device according to claim 1, wherein the rear electrode layer, the dielectric layer, the phosphor layer, and the intrinsically conductive layer each further comprises an independently selected binder.

6. The electroluminescent device according to claim 5, wherein the binder in the rear electrode layer, the dielectric layer, the phosphor layer, and the intrinsically conductive layer is independently selected from one or more of olefinic rubbers, copolymers of butadiene and isoprene with ethylenically unsaturated monomers, copolymers of diene monomers, silicone rubbers, homopolymers, random copolymers, and block and graft copolymers of ethylene oxide, thermoplastic polyurethane rubbers, thermoplastic olefinic rubbers, and acrylate and methacrylate end-capped oligomers.

7. The electroluminescent device according to claim 1, wherein the intrinsically conductive layer has a resistance of from about 5 Q/☐ to about 3000 Q/☐.

8. The electroluminescent device according to claim 1, wherein at least one of the rear electrode layer, the dielectric layer, the phosphor layer, and the intrinsically conductive layer is UV-cured.

9. The electroluminescent device according to claim 1, wherein the rear electrode layer, the dielectric layer, the phosphor layer, and the intrinsically conductive layer is each UV-cured.

10. An electroluminescent device comprising:
a substrate layer;
a rear electrode layer;
a dielectric layer;
a phosphor layer; and
an intrinsically conductive layer;
wherein each of the rear electrode layer, the dielectric layer, the phosphor layer and the intrinsically conductive layer comprise a binder of rubber.

11. The electroluminescent device according to claim 10, wherein at least one of the rear electrode layer, the dielectric layer, the phosphor layer and the intrinsically conductive layer comprises a binder that is distinct from the binder in at least one of the rear electrode layer, the dielectric layer, the phosphor layer and the intrinsically conductive layer.

12. The electroluminescent device according to claim 10, wherein the binder for each of the rear electrode layer, the dielectric layer, the phosphor layer and the intrinsically conductive layer is independently selected from one or more of olefinic rubbers, copolymers of butadiene and isoprene with ethylenically unsaturated monomers, copolymers of diene monomers, silicone rubbers, homopolymers, random copolymers, and block and graft copolymers of ethylene oxide, thermoplastic polyurethane rubbers, thermoplastic olefinic rubbers, and acrylate and methacrylate end-capped oligomers.

* * * * *